(12) United States Patent
Shipman

(10) Patent No.: US 6,467,924 B2
(45) Date of Patent: Oct. 22, 2002

(54) KEYBOARD HAVING ILLUMINATED KEYS

(76) Inventor: Michael Shipman, 1614 Via Tulipan, San Clemente, CA (US) 92673

( * ) Notice: Subject to any disclaimer, the term of this patent is extended or adjusted under 35 U.S.C. 154(b) by 0 days.

(21) Appl. No.: 09/836,628

(22) Filed: Apr. 16, 2001

(65) Prior Publication Data

US 2001/0022722 A1 Sep. 20, 2001

Related U.S. Application Data

(63) Continuation-in-part of application No. 09/500,735, filed on Feb. 9, 2000, now Pat. No. 6,217,183, which is a continuation of application No. 09/396,141, filed on Sep. 15, 1999, now abandoned.

(51) Int. Cl.$^7$ ................................................. F21V 8/00
(52) U.S. Cl. ........................... 362/31; 362/23; 362/29; 362/30; 362/84; 341/22; 200/313; 200/314
(58) Field of Search ........................... 341/22, 84, 200, 341/7, 340, 472, 142, 708; 362/23, 29, 30, 31, 32, 84, 551, 555, 558, 559; 200/313, 314

(56) References Cited

U.S. PATENT DOCUMENTS

| | | | |
|---|---|---|---|
| 3,886,544 A | 5/1975 | Narodny | 340/365 P |
| 3,934,245 A | 1/1976 | Mueller | 340/324 R |
| 4,060,703 A | * 11/1977 | Everett, Jr. | 200/5 A |
| 4,124,879 A | 11/1978 | Schoemer | 362/26 |
| 4,177,501 A | 12/1979 | Karlin | 362/26 |
| 4,320,268 A | 3/1982 | Brown | 200/5 A |
| 4,449,024 A | 5/1984 | Stracener | 200/317 |
| 4,489,227 A | 12/1984 | Lamarche | 200/314 |
| 4,670,633 A | 6/1987 | Kaiwa et al. | 200/314 |
| 4,727,357 A | 2/1988 | Curtin et al. | 340/365 P |
| 4,806,908 A | 2/1989 | Krupnik | 341/22 |
| 4,811,175 A | 3/1989 | DeSmet | 362/95 |
| D311,913 S | 11/1990 | Schaum | D14/114 |
| 5,034,602 A | 7/1991 | Garcia, Jr. et al. | 250/227.22 |
| 5,045,755 A | 9/1991 | Appelberg | 313/498 |
| 5,097,396 A | 3/1992 | Myers | 362/32 |
| 5,384,459 A | 1/1995 | Patino et al. | 250/229 |
| 5,432,684 A | 7/1995 | Fye et al. | 362/30 |
| 5,491,313 A | 2/1996 | Bartley et al. | 200/310 |
| 5,510,782 A | 4/1996 | Norris et al. | 341/22 |
| 5,512,718 A | 4/1996 | Larose | 200/314 |
| 5,542,016 A | 7/1996 | Kaschke | 385/123 |
| 5,747,756 A | 5/1998 | Boedecker | 200/5 A |
| 5,797,482 A | 8/1998 | LaPointe et al. | 200/314 |
| 5,807,002 A | 9/1998 | Tsai | 400/494 |
| 5,871,088 A | 2/1999 | Tanabe | 200/514 |
| 5,899,553 A | 5/1999 | Howell | 362/84 |
| 5,975,711 A | 11/1999 | Parker et al. | 362/24 |
| 5,993,019 A | 11/1999 | Kline et al. | 362/29 |
| 6,179,432 B1 | 1/2001 | Zhang et al. | 362/84 |
| 6,199,996 B1 | 3/2001 | Katrinecz, Jr. et al. | 362/85 |
| 6,322,229 B1 | * 11/2001 | Chan et al. | 362/85 |

FOREIGN PATENT DOCUMENTS

| | | | |
|---|---|---|---|
| WO | WO 98/48394 | 10/1998 | G08C/23/00 |

* cited by examiner

*Primary Examiner*—Sandra O'Shea
*Assistant Examiner*—David V. Hobden
(74) *Attorney, Agent, or Firm*—Drummond & Duckworth

(57) ABSTRACT

A keyboard is provided having illuminating keys. The keyboard includes a light channeling membrane and key members constructed at least partially of translucent material so that light produced from a light source is channeled upwardly to the upper surfaces of the key members. The light source may include LED or LEC systems in adjoining relationship to the light channeling membrane. However, in a preferred embodiment, the light source is constructed of a substantially planar illuminescent sheet which underlies the light channeling membrane.

5 Claims, 5 Drawing Sheets

KEYBOARD HAVING ILLUMINATED KEYS

RELATED APPLICATIONS

This application is a continuation-in-part application of U.S. application Ser. No. 09/500,735 filed on Feb. 9, 2000 U.S. Pat. No. 6,217,183, issued on Apr. 17, 2001, which in turn is a continuation application of U.S. patent application Ser. No. 09/396,141, filed on Sep. 15, 1999, and abandoned on Apr. 27, 2001.

BACKGROUND OF THE INVENTION

The present invention relates generally to keyboards, including typewriter and computer keyboards.

More specifically, the present invention relates to keyboards having illuminated key members.

Conventional keyboards include a plurality of key members which display symbols, such as alphanumeric keys, on their top surfaces. Moreover, typical modern keyboards for both electric typewriters and computers utilize a make-and-break electrical circuit which is activated by depression of a key member for identifying a particular symbol embedded on the top of the key member.

A problem with prior art keyboards is that it is often difficult to discern the symbol appearing on the top of the key member under poor lighting conditions. This causes the keyboard operator to memorize the key locations or to strain their eyes to operate the keys of the keyboard under low light conditions. This has become a much greater problem in present day society as keyboards have become necessary for everyday use and as keyboard use is not limited primarily to operation by workers in business offices as in the past. As a result of this expansion of keyboard use, more and more operators have less training on keyboards, and correspondingly many keyboard operators utilize a "hunt and peck" style of keyboard operation.

Moreover, the advent of laptop and notebook computers has resulted in the use of keyboards at places where they were not previously operated. Often these places provide limited light making it difficult for keyboard operators to quickly and easily operate the keyboard. For example, it is a common sight on commercial aircraft to see a passenger slowly hunt and peck at their keyboards continuously looking at the key members to verify that they are in fact pressing the correct keys.

Accordingly, it is clear that there is a need for an apparatus that makes keyboard key members more discernable in low light conditions. Backlighting is commonly used in rubber keypads, membrane switches, rigid panels and the like to make them more visible and discernable. These keypad panels typically make use of light emitting crystals (LECs), liquid emitting diodes (LEDs), and/or fiberoptics for this purpose. Most prior backlit keyboards utilize a light source which is typically transmitted via a fiberoptic cable to the key members of a keypad. For example, U.S. Pat. No. 5,034,602 issued to Garcia, Jr. et al. discloses an optically activated keyboard which uses fiberoptic cables to transmit light to translucent key members. The light is transmitted through the translucent key members where it is emitted from the top of the key cap. Similarly, U.S. Pat. No. 3,886,544 issued to Narodny and U.S. Pat. No. 5,097,396 issued to Myers disclose keyboards which use backlighting. Each key member in connection to a fiberoptic cable which transmits light to a respective key member which thereafter transmits light from the top of the key cap. Additional keyboard and keypad techniques include the LED and LEC backlighting commonly utilized for alarm activator and deactivator keypads wherein each key includes a separate LED or LEC structure embedded in or behind the key member.

Unfortunately, keyboard and keypad backlighting devices which utilize LED, LEC or fiberoptics are relatively expensive to construct. In addition, it is extremely difficult, if not impossible, to route fiberoptics to the keyboard keys of today's computer systems. For example, it would be particularly difficult to route fiberoptic cables and provide a light source to the key members of today's notebook computers and palm-sized computer systems.

In addition, the light sources for use with prior art backlit keyboards require substantial power and in some cases, a fan for cooling which draws additional power. These constructions are prohibitive for portable computers such as laptop and notebook computers which draw on the power of a rechargeable battery and where power is at a premium.

Accordingly, it would be highly advantageous to provide a keyboard having illuminated key members suitable for use with today's computer systems including portable computers.

It would also be highly advantageous to provide a keyboard having illuminated keys which does not require routing of fiberoptic cables to each key member.

In addition, it would be highly advantageous to provide a keyboard having illuminated key members which is light weight, simple and inexpensive to manufacture, and requires low power consumption.

SUMMARY OF THE INVENTION

Briefly, in accordance with the invention, I provide an improved keyboard having illuminated key members. The improved keyboard includes a plurality of key members and, preferably, a light channeling membrane. Both the light channeling member and key members are constructed of a substantially translucent material capable of channeling light rays. In addition, the keyboard of the present invention includes a light source optically connected to the light channeling membrane. In operation, the light source produces light rays which are received by the light channeling membrane which underlies the plurality of key members. The light rays are channeled through the light channeling membrane to the key members which receive the light rays at their lower extremities and channel the light rays upwardly to their top surface. Light is then emitted from the top of the key member to either provide illumination around an opaque construction of a symbol displayed on the top surface of the key member, or in the alternative, to emit light rays in the shape of the symbol itself.

In a preferred embodiment, the light channeling membrane and plurality of key members are manufactured of an acrylic plastic for optical clarity, though other materials may be used depending on weight and manufacturing limitations as would be understood by those skilled in the art. For this embodiment, the light channeling membrane includes a plurality of bores, with each bore being constructed for receipt of the key shaft of a corresponding key member. Meanwhile, each key member also includes a key cap having a symbol displayed thereon. Each key member shaft is constructed to extend downwardly and telescopically into a corresponding bore of the light channeling membrane. Light is channeled through the translucent material of the light channeling membrane until it is emitted from cylindrical sidewalls into the membrane's bores. Light emitted from the bores' interior sidewalls is received onto the exterior of the shafts of the key members and channeled upwardly through the translucent material of the shaft, to the key caps which are also constructed of a translucent material. The key cap includes an upper surface having an alphanumeric symbol displayed thereon which is illuminated by light passing through the shaft of the key member to provide the desired illuminated alphanumeric symbol. The symbol can be constructed as light emitting or as opaque with the remainder of the top surface being conversely opaque or light emitting, depending on whether the desired symbol is in either a negative or a positive representation thereof.

In a preferred embodiment, the light source is constructed of a substantially planar sheet underlying the light channeling membrane of the keyboard. A preferred construction for the illuminating sheet of the light source is described in U.S. Pat. No. 5,045,755 issued to Appelberg and assigned to E-Lite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which can be adhesively attached to the bottom of the keyboard light channeling membrane. Moreover, the illuminating sheet is sufficiently thin as to not require significant modification to existing computer keyboards designs.

An additional preferred construction of the luminescent sheet can be obtained from MKS, Inc. located in Bridgeton, N.J., USA under the trademark designation Quantaflex. The Quantaflex material is an electroluminescent lamp including luminescent phosphors embedded in the dielectric medium of a capacitor constructed in the form of a sheet. Electrodes, including at least one translucent electrode, form the top and bottom layers of the Quantaflex material. Upon application of an alternating current to the electrodes, the phosphors give off photons producing light in the visible spectrum. An advantage of the Quantaflex material is that the phosphors can be selectively encapsulated between the electrode layers of the luminescent sheet so as to selectively produce patterns of light emitted from the luminescent sheet. For example, for application with the present invention, it is preferred that the Quantaflex material be constructed to produce light only below and/or immediately adjacent to the key members so as to reduce power consumption.

In an additional preferred embodiment, the luminescent sheet is constructed of one the rapidly developing technologies directed to Organic Light Emitting Devices (OLED), Transparent Organic Light Emitting Devices (TOLED), or Flexible Organic Light Emitting Devices (FOLED). These technologies are available to those skilled in the art and will not be described in further detail herein.

In still an additional preferred embodiment, the luminescent sheet is constructed of a substantially translucent material, such as an acrylic plastic, connected to an independent light source such a fiberoptic light source, light emitting diodes, light emitting crystals, etc.

Where the keyboard of the present invention utilizes an illuminating sheet for a light source, the illuminating sheet may be formed with a plurality of holes. The luminescent sheet is then affixed below the light channeling membrane with the bores of the luminescent sheet underlining the bores projecting through the light channeling membrane. This construction permits the shafts of the key members to project through the membrane bores and through the holes of the illuminating sheet. Where the keyboard is constructed for use with a computer, disposed below the illuminating sheet is a elastic diaphragm, for biasing the key members upwardly, and a keyboard circuit board. The circuit board includes a plurality of switches which are closeable upon pressure application such that depression of the key members causes the respective key shafts to project downwardly through the membrane bores and illuminating sheet holes to depress the elastic diaphragm to, in turn, engage the circuit board switches. The closure of a particular circuit board switch results in a corresponding signal being sent to the computer indicating that a particular key member has been depressed.

In an additional embodiment of the present invention, the light source, constructed in the form of a planar luminescent sheet, is disposed between the elastic diaphragm and circuit board. The elastic diaphragm is manufactured of a translucent material so that light emitted upwardly from the luminescent sheet shines upon the bottoms of the key member shafts, and preferably upon the bottom of the upper clamshell member of the keyboard which is also preferably manufactured of a translucent material. For this embodiment, the elastic diaphragm and upper clamshell member cooperate to function as a light channeling membrane to transmit light from the light source to the key members. The light is then channeled through the key members to be transmitted from the tops of their key caps.

In still an additional embodiment of the present invention, the keyboard is constructed with the light source, in the form of a planar luminescent sheet, positioned to underlie the elastic diaphragm and circuit board of the keyboard. The elastic diaphragm and circuit board are manufactured of substantially translucent materials for permitting light emitted from the luminescent sheet to project upwardly through the circuit board and elastic diaphragm to strike the bottom, extremities of the key members. It is preferred that the keyboard include a separate light channeling membrane for channeling light rays to the sidewalls of the key member shafts. However, for this embodiment, the elastic diaphragm and circuit board of the key board may function as the light channeling membrane. Light emitted from the planar sheet is channeled through the translucent material of the elastic diaphragm and circuit board to the key members. The light is then transmitted through the key members to the key member's upper surface where it is emitted from the top of the key cap in the shape of a character displayed on the key cap.

In still an alternative embodiment, the light source is comprised of one or more fiberoptic cables. The fiberoptic cables are constructed to project light laterally from their cylindrical exterior as opposed to predominantly from their distal extremities. This can be accomplished by notching, knurling, scratching or in other manners to create flaws in the otherwise smooth exterior cylindrical surface of the fiberoptic cable. These flaws have been found to interrupt the transmission of light along the length of the fiberoptic cable and to transmit light laterally from the exterior surface of the fiberoptic cable. For application with the present invention, the fiberoptic cables are routed alongside, below or through the light channeling membrane so that light transmitted through the fiberoptic cable is transmitted laterally to be received by the keyboard light channeling membrane. The light is then channeled through the light channeling membrane and key members so as to be emitted from the upper surface of the key members to illuminate a symbol or character.

Preferably, substantial portions of the keyboard and key members are coated on their exterior surfaces with a reflective opaque coating such as paint or the like where light is not intended to be emitted from their exteriors. For example, it is preferred that the keyboard be coated with an opaque material in the interstitial regions between the key members so that light does not project upwardly between the key members which would cause visual glare to the keyboard operator or which would otherwise detract from the relative illuminescence of the symbols displayed on each of the key members.

It is thus an object of the present invention to provide an inexpensive simple to construct keyboard having illuminating keys.

It is also an object of the present invention to provide a keyboard having illuminated key members suitable for use with today's computer systems including portable computers.

Moreover, it is an object of the present invention to provide a keyboard having illuminated key members which does not require routing of fiberoptic cables to each key member.

These and other and more specific objects and advantages of the invention will be apparent to those skilled in the art from the following detailed description taken in conjunction with the drawings.

DETAILED DESCRIPTION OF PREFERRED EMBODIMENTS

Figure 1:
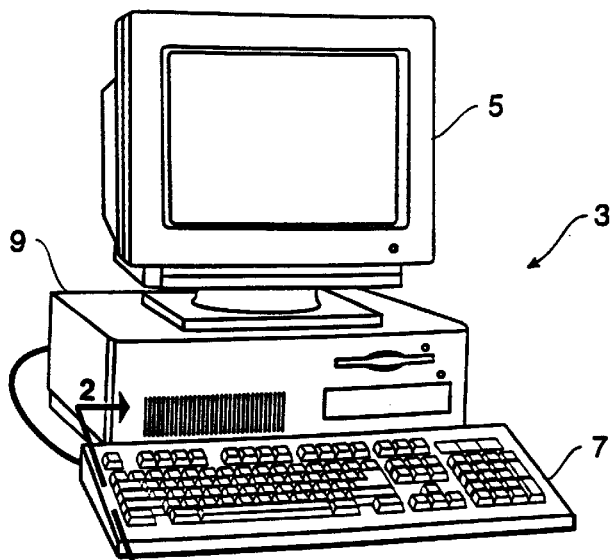
FIG. 1 is a perspective view of a computer including keyboard of the prior art.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to specific embodiments illustrated.

Figure 2:
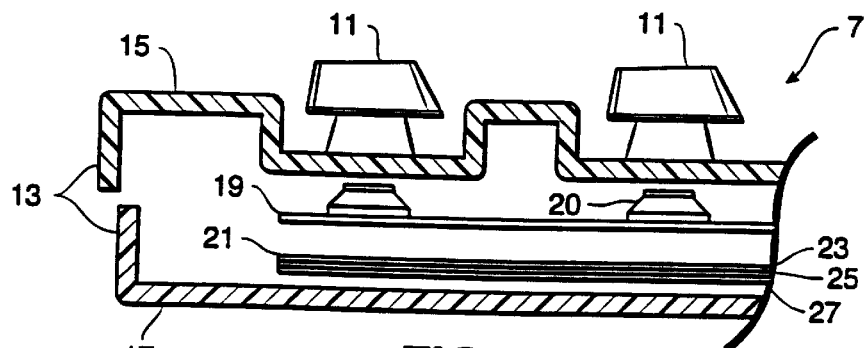
FIG. 2 is a cutaway view of the keyboard shown in FIG. 1.
Figure 3:
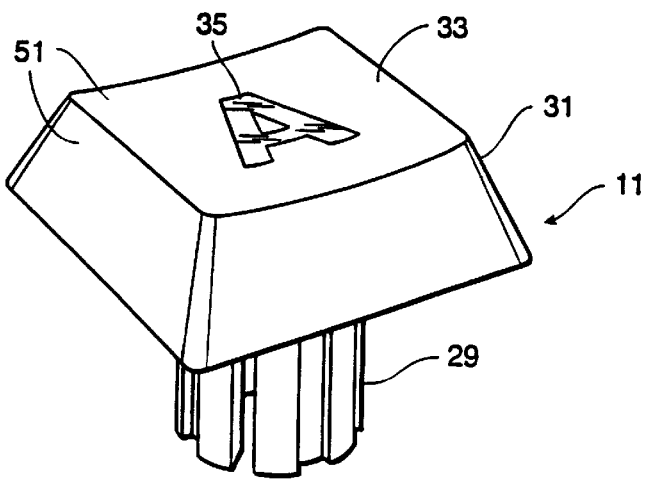
FIG. 3 is a perspective view of a preferred embodiment of a key member for use with the keyboard having illuminated keys of the present invention.

Referring to FIGS. 1–3, keyboards are required to operate numerous apparatus including computers, typewriters and personal organizers, as well as aircraft and vehicular instrument panels. A typical prior art keyboard 7 is shown in FIG. 1 for use with a computer 3. The computer 3 also includes a central processing unit 9 and monitor 5. By pressing key members 11 on the keyboard 7, one sends signals to the central processing unit 9 instructing the computer 3 to perform various functions.

As shown in FIG. 2, a typical keyboard 7 includes a housing 13 comprising an upper clamshell member 15 and lower clamshell member 17. The keyboard 7 further includes a plurality of key members 11 and a diaphragm 19 having elastic diaphragm projections 20 for biasing the key members 11 to a normally upward position. A typical computer keyboard 7 further includes a circuit board 21 which is disposed below the key members 11 and diaphragm 19. The circuit board 21 includes first and second printed wiring layers 23 and 27 which include engraved or embedded electrical circuits. The printed wiring layers 23 and 27 are separated by an insulator or dielectric layer 25. The insulator layer 25 includes a plurality of holes so that depression downwardly of the key members 11 causes the diaphragm projection 20 to be forced downwardly upon the upper printed wiring layer 23 so that printed wiring layers 23 and 27 can come in contact to open and close distinctive electrical switches through the holes of the insulator layer 25. Each of these electrical switches correspond to different key members 11 so that the keyboard operator can depress key members either individually or in combination to send various signals to the computer's central processing unit 9.

With reference to FIG. 3–7, Applicant provides a keyboard 1 having illuminated key members 11. Each key member 11 includes a key shaft 29 and a key cap 31. Displayed on the top surface 33 of the key cap 31 is a symbol 35 such as an alphanumeric character. For application of the keyboard 1 of the present invention, the key member 11 is constructed at least partially of a substantially translucent light channeling material so that light can be received by the outer surfaces of the key shaft 29 and channeled upwardly to be emitted from the key cap's upper surface 33. In a first embodiment, light rays are emitted from the symbol 35 itself in which the translucent material portion of the key cap 31 extends through the key shaft 29 and key cap 31 to the key symbol 35. The remaining portion of the key cap upper surface 33 is constructed of a non-light emitting material or covered by an opaque coating 51 (FIG. 3). In the alternative, the entire key cap 31 including upper surface 33 is constructed of translucent light emitting material while the symbol 35 is formed of a non-light emitting material, depending whether the symbol 35 is intended to be displayed as a negative or positive representation.

Figure 4:
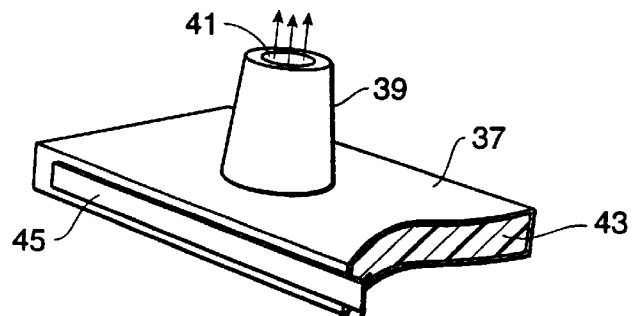
FIG. 4 is a perspective cutaway view of the translucent light channeling membrane for use with the keyboard having illuminated keys of the present invention illustrating a light source as an LED or LEC component.
Figure 5:
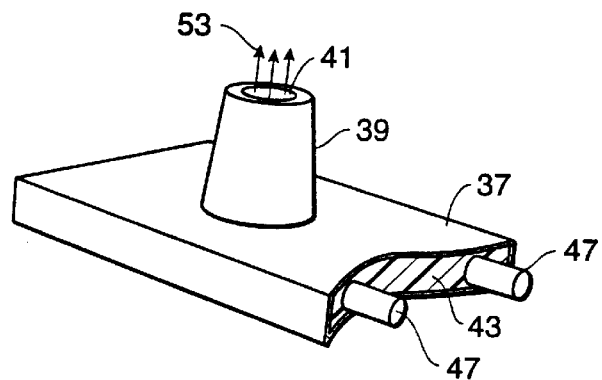
FIG. 5 is a perspective cutaway view of the translucent light channeling membrane for use with the keyboard having illuminated keys of the present invention illustrating a light source as one or more fiberoptic cables embedded in the translucent light channeling membrane.
Figure 6:
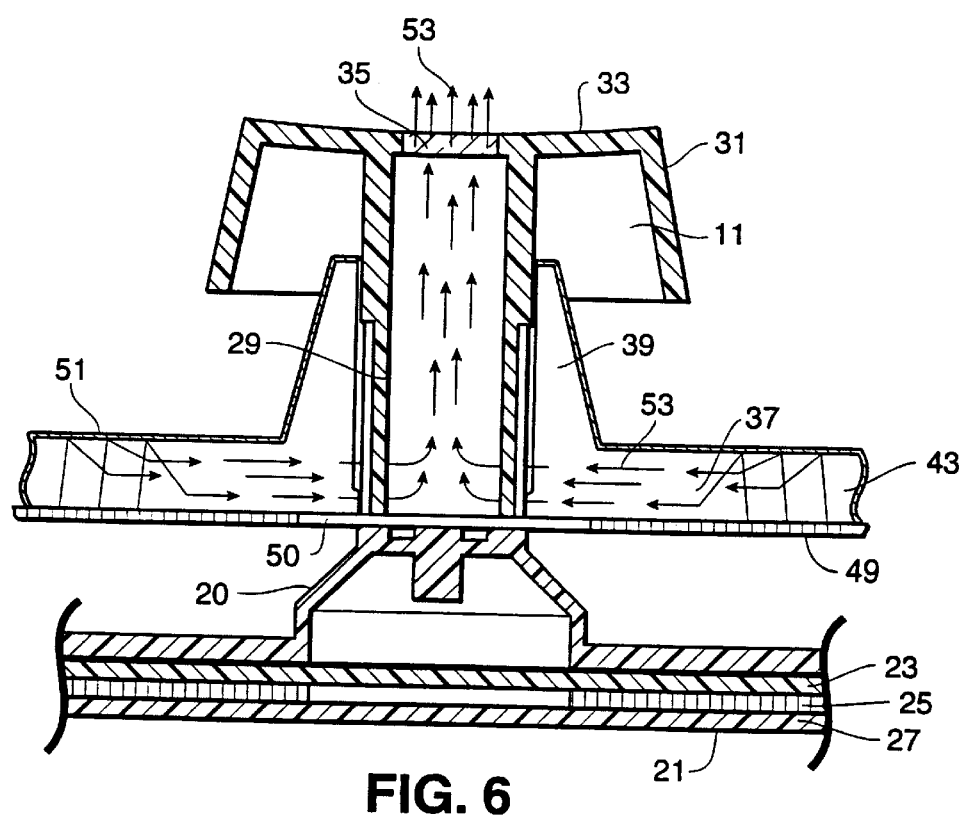
FIG. 6 is a cutaway view of a preferred keyboard having illuminated keys of the present invention wherein the light source is a planar illuminating sheet underlying the light channeling membrane of the keyboard.
Figure 7:
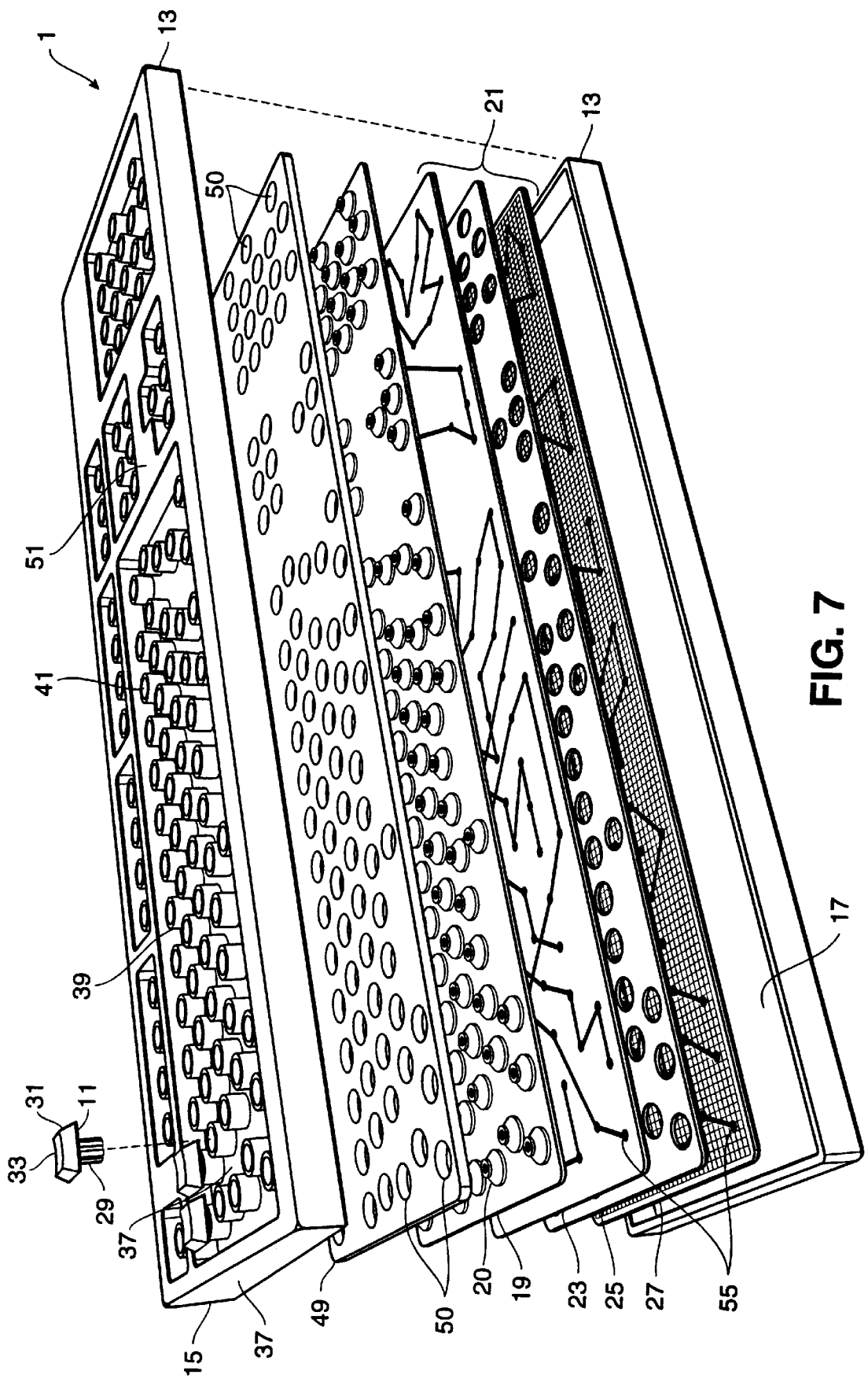
FIG. 7 is an exploded view of the keyboard having illuminated keys of the present invention in which the light source is a planar illuminating sheet underlying the light channeling membrane of the keyboard.

With reference to FIGS. 4–7, the keyboard 1 of the present invention includes a light channeling membrane 37. The light channeling membrane 37 underlies the key members 11 and is constructed to channel light rays 53 from a light source to the key shafts 29 of the key members 11, which in turn channel the light rays 53 along the length of the key shafts 29 to the key cap's upper surfaces 33. As shown in FIGS. 6 and 7, the light channeling membrane 37 is incorporated into the upper clamshell portion 15 of the keyboard's housing 13. This is accomplished by constructing the upper clamshell member 15 at least partially of a translucent light channeling material. Light rays 53 received upon the light channeling membrane's 37 outer surface is channeled throughout the translucent material to the key members 11. Preferably, the upper surface of the light channeling membrane 37 is coated or otherwise constructed with an opaque coating 51 so that only the upper surfaces 33 of the key members 11 are seen to illuminate by the keyboard operator. As shown in FIGS. 6 and 7, in a preferred embodiment, the light channeling membrane 37 includes a plurality of conical projections 39 having central longitudinal bores 41 configured for receipt of the key shafts 29 of the key members 11. Preferably, the keyboard 1 includes a diaphragm 19 having a plurality of elastic projections 20 for biasing the key members 11 upwardly.

In addition to the specially constructed key members 11 and light channeling membrane 37, the keyboard 1 of the present invention includes a light source optically connected to the light channeling membrane 37. The light source may be embedded in, positioned alongside, or positioned underneath the light channeling membrane to communicate light to the light channeling membrane 37. As shown in FIG. 4, in a first embodiment, the light source is comprised of one or more light strips 45 which can be either liquid emitting diodes (LED) or light emitting crystals (LEC) systems or other constructions known to those skilled in the art which emit light into (as shown in FIG. 5), or upon the exterior side or bottom surfaces of the light channeling membrane 37. With reference to FIG. 5, in a second embodiment, the light source is made up of one or more fiberoptic cables 47 which are constructed to project light laterally from their cylindrical exterior. In particular, it has been found that fiberoptic cables 47 provide a highly luminescent surface where the curved cylindrical surface has been notched, knurled, scratched or otherwise flawed so that the flaws receive light rays from the interior of the fiberoptic cables 47 and emit those light rays laterally from the fiberoptic cable's exterior surface. For application with the present invention, the fiberoptic cables 47 are routed alongside, below or embedded in the light channeling membrane 37 so that light rays 53 emitted from the cylindrical outer surface of the fiberoptic cables 47 are received by the translucent material and channeled within the membrane's translucent region 43 to the key members 11.

In another preferred embodiment of the invention, the light source is constructed as a substantially planar sheet 49 affixed below the bottom surface of the light channeling membrane 37. Luminescent planar sheets can be constructed by those skilled in the art using various technologies. For example, the luminescent planar sheets may be constructed of an electroluminescent lamp, an Organic Light Emitting Device (OLED), a Transparent Organic Light Emitting Device (TOLED), or a Flexible Organic Light Emitting Device (FOLED). Alternatively, the luminescent sheet may be constructed of a substantially translucent material which acts as a "light pipe" connected to an independent light source such a fiberoptic light source, light emitting diodes, or light emitting crystals. The translucent material channels the light from the light source to the keys, or to a separate light channeling membrane 37 to illuminate the keys.

As shown in FIGS. 6 and 7, in one of the preferred embodiments, the planar sheet 49 is preferably constructed with a plurality of holes 50 which underlie the conical projections 39 and longitudinally extending bores 41 of the light channeling membrane 37. A shown in FIG. 7, this construction permits the key shafts 29 of the key members 11 to telescope downwardly into the bores 41 and through the holes 50 of the luminescent sheet 49. Though the key members 11 are normally biased upwardly by the elastomeric projections 20 of the diaphragm 19, downward depression of the key members 11 by fingertip pressure on the key member's upper surfaces 33 causes the key shafts 29 to project downwardly through bores 41 and holes 50 until the bottom extremity of the key member 11 forces the diaphragm projections 20 to forcibly close electrical switches 55 in the circuit board 21.

Figure 8:
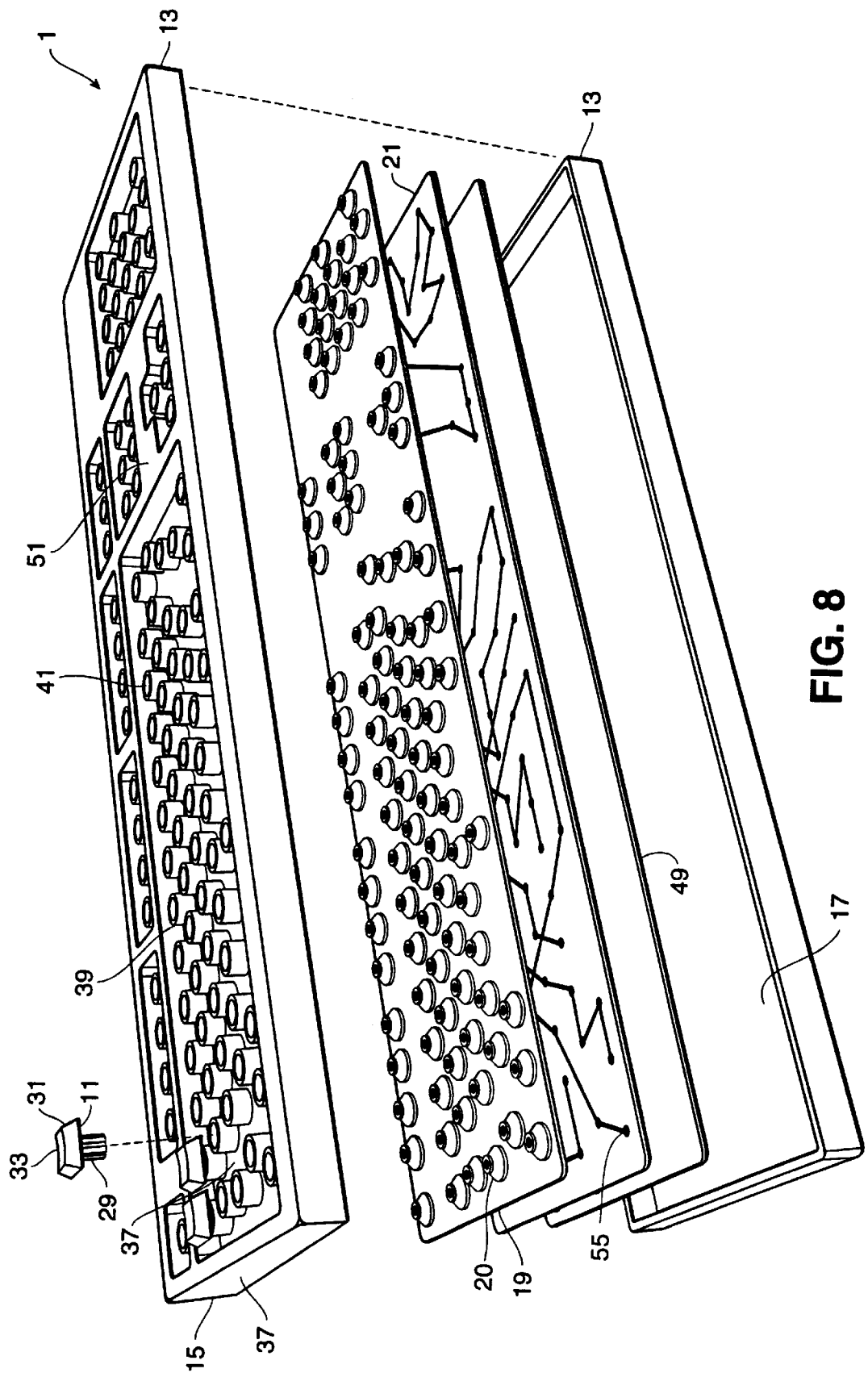
FIG. 8 is a cutaway view of a preferred keyboard having illuminated keys of the present invention wherein the light source is a planar illuminating sheet underlying the diaphragm and circuit board of the keyboard.
Figure 9:
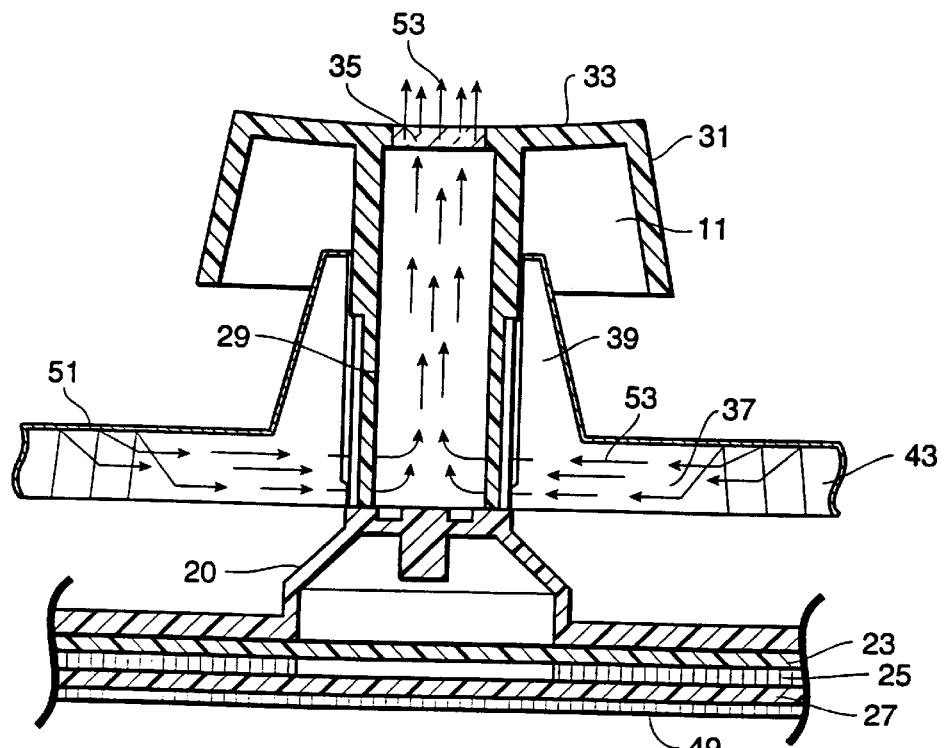
FIG. 9 is an exploded view of the keyboard having illuminated keys of the present invention in which the light source is a planar illuminating sheet underlying the diaphragm and the circuit board of the keyboard.

With reference to FIGS. 8 and 9, in an additional preferred embodiment, the planar luminescent sheet 49 underlies both the diaphragm 19 and the circuit board 21. The diaphragm and circuit board are constructed to be substantially translucent, and light emitted upwardly by the luminescent planar sheet 49 is transmitted through the translucent diaphragm and circuit board to the bottom of the key members 11. Because the key member are also manufactured of a translucent material, the light is then channeled through the key members' shafts 29 to be emitted from the key's upper surface 33 in the form of a symbol 35.

With reference also to FIGS. 6 and 7, this embodiment has the benefit of not requiring that the upper clamshell member 15 of the keyboard be manufactured of a translucent material so as to function as a light channeling membrane 37. Instead, the translucent circuit board 21 and diaphragm 19 operate as a light channeling membrane by communicating light emitted by the planar sheet 49 to the bottom extremities of the key members 11. Light is then emitted from the upper surfaces 33 of the key members. Also with reference to FIGS. 6 and 7, this embodiment also has the benefit of not requiring that the luminescent planar sheet 49 be formed with holes 50 underlying each of the key members for permitting the shafts 29 of the key members to project downwardly through the holes so as to engage the diaphragm 19 and circuit board 21. Instead, the keyboard is constructed with the luminescent planar sheet positioned so as to avoid contact with the moving members of the keyboard, the key members and diaphragm. For this embodiment of the present invention, it is preferred that the luminescent planar sheet not include any holes so that the luminescent planar sheet can provide a maximum of luminosity to the key members.

Figure 10:
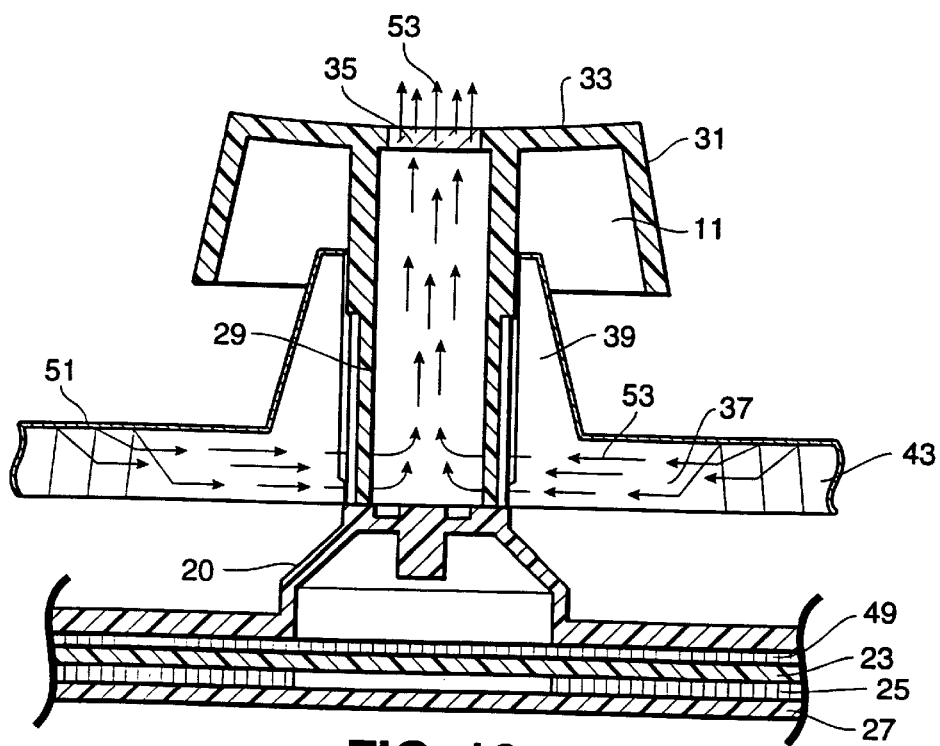
FIG. 10 is an exploded view of the keyboard having illuminated keys of the present invention in which the light source is a planar illuminating sheet positioned between the elastic diaphragm and circuit board of the keyboard.

With reference also to FIG. 10, in an additional embodiment of the present invention, the light source 49 is positioned between the diaphragm 19 and circuit board 21. The light source is again constructed in planar form having at least its top side providing luminescence. The elastic diaphragm is manufactured of a translucent material so that light emitted upwardly from the light source, in the form of a luminescent sheet 49, shines through the diaphragm projections 20 and upon the bottoms of the key member shafts 11. Preferably, for this embodiment, the upper clamshell member 15 of the keyboard is also preferably manufactured of a translucent material so that light emitted from the luminescent sheet strikes the underside of the upper clamshell member 15 and is channeled to the sidewalls of the key members. For this embodiment, the elastic diaphragm and upper clamshell member cooperate to function as a light channeling membrane, transmitting light from the light source to the key members 11. The light is then channeled through the key members to be transmitted from the tops 33 of the key caps 31.

This embodiment has the advantage over the previous embodiment in that light emitted from the light source is not transmitted through the circuit board 21 prior to striking the outer surfaces of the key members 11 which could cause diminished luminescence from the key members due to light reflection, refraction or absorption caused by the optical properties of the circuit board. However, this embodiment has the disadvantage over the prior described embodiment in that the light source is disposed between the key members and the circuit board. This construction requires that the light source be compressed with each actuation of the keyboard key members unless the light source is constructed with holes to permit the key members to engage the circuit board directly which would also diminish to amount of light emitted from the key members. Though troublesome, this disadvantage can be overcome using the above described material from MKS, Inc. which it is believed can withstand the cyclic compression stemming from the actuations of the key members.

The present invention provides for an inexpensive and simple to manufacture keyboard including keys having illuminated upper surfaces. The keyboard of the present invention is particularly suitable for use with computers and particularly with laptop computers, though it is not intended that the present invention be limited thereto. While several particular forms of the invention have been illustrated and described, it will be apparent that various modifications can be made without departing from the spirit and scope of the invention. Accordingly, it is not intended that the invention be limited except by the following claims.

I claim:

1. A lighted computer keyboard comprising:

a keyboard housing including an upper clamshell member, said upper clamshell member being at least partially translucent to channel light;

a plurality of key members constructed of a substantially hard non-deformable material positioned within said keyboard housing;

an elastic diaphragm underlying said key members for biasing said key members in an upward direction;

a circuit board underlying said plurality of key members and said elastic diaphragm, said circuit board being operational to produce signals in response to depression of said key members; and a light source optically connected to said clamshell member for communicating light to said clamshell member, said clamshell member channeling light to at least some of said plurality of key members.

2. The lighted computer keyboard of claim 1 wherein said light source include LEDs or LECs.

3. The lighted computer keyboard of claim 2 wherein said LEDs or LECs are embedded in said clamshell member.

4. The lighted computer keyboard of claim 1 wherein said light source include fiber optic cables.

5. The lighted computer keyboard of claim 4 wherein said fiberoptic cables are embedded in said clamshell member.

* * * * *